Aug. 3, 1937.  A. JOHNSON  2,088,599
CLUTCH
Filed Sept. 27, 1934
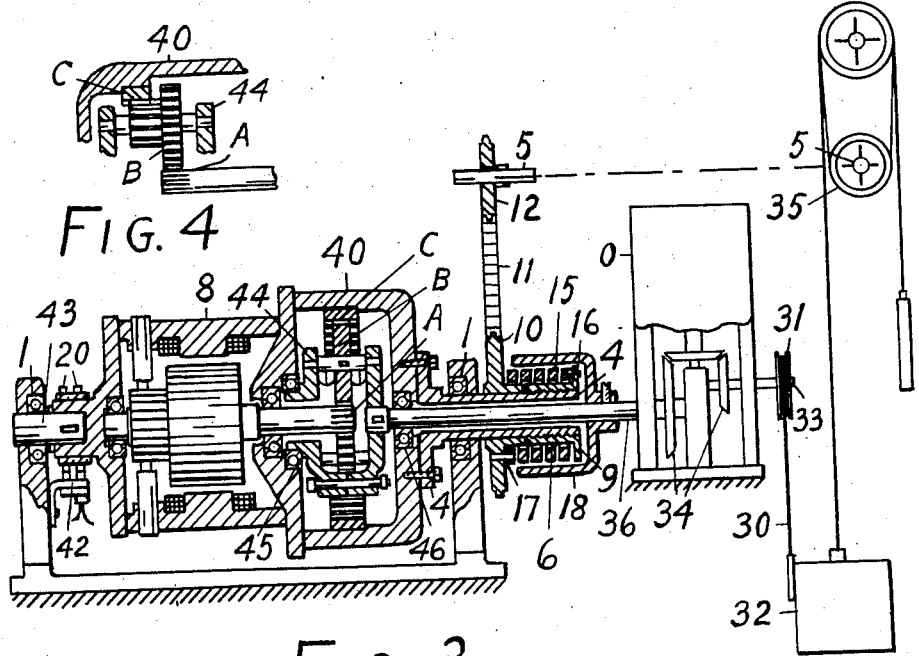
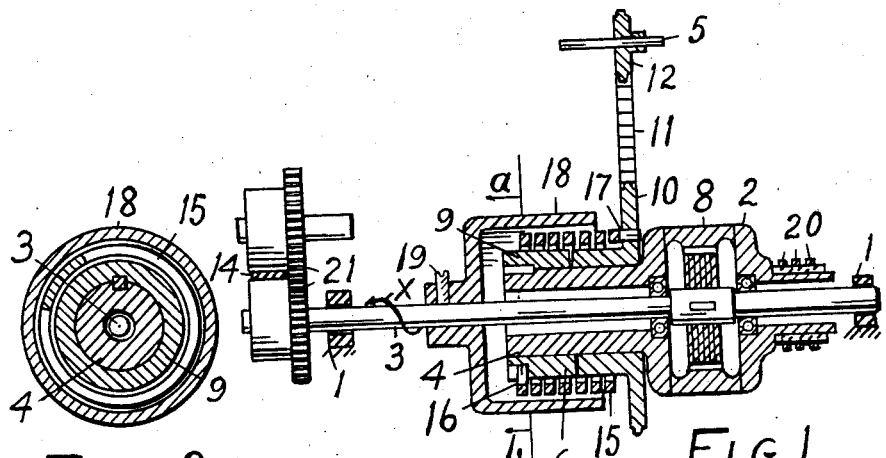
Alfred Johnson
INVENTOR Patented Aug. 3, 1937

2,088,599

UNITED STATES PATENT OFFICE 2,088,599

CLUTCH

Alfred Johnson, New York, N. Y.

Application September 27, 1934, Serial No. 745,685

8 Claims. (Cl. 172—239)

The invention consists in the construction and novel combination and arrangement of parts hereinafter fully described, illustrated in the accompanying drawing and pointed out in the claims hereunto appended.

This application is a continuation in part of my prior application, filed June 18, 1932, Serial No. 617,958, for Tapedrive.

The invention can probably best be understood by describing a specific embodiment thereof.

Accordingly referring to the drawing which forms part of this specification:

Figure 1 is a sectional view illustrating my invention inserted in a driving connection for tensioning mechanism employed in connection with an element having lineal continuity and movable in accordance with the takeup or payout movement of driven mechanism.

Figure 2 is a sectional view taken substantially on line a—b of Figure 1.

Figure 3 is a sectional view illustrating a geared embodiment of my invention inserted in a driving connection for apparatus movable in accordance with the movement of elevator cars.

Figure 4 is a detail view of a preferred form of compounded idler gearing for the clutch illustrated in Figure 3.

Like reference characters denote similar parts in all the figures.

I will now proceed to describe Figures 1 and 2, in which I have illustrated a torque controlled clutch and an electromagnetic gear with a rotatable outer member and a rotatable inner member.

The gear or motor, designated as a whole by the numeral 8, is provided with suitable windings which are led to sliprings. The number of sliprings of course depends on the type of motor.

The torque controlled clutch, designated as a whole by the numeral 6, is provided with an adjustable brake drum and a friction member connected in the line of power transmission in such a manner that the friction member and the drum co-act with one another to yieldingly resist relative movement of the motor parts when the torque of the motor falls below a predetermined value.

Referring to Figure 1, the torque motor 8 and the clutch 6 are rotatably mounted on the bearings 1. The frame member 2, is rotatably mounted on antifriction bearings on the shaft 3, and in the present embodiment of the invention, the field frame or housing 2, has a sleeve extension 4. Mounted on the sleeve extension 4, in such a manner as to rotate therewith, or be driven thereby, there is a sleeve-like member 9. Freely rotatable on the sleeve extension 4, there is a rotatable sprocket wheel 10, which is driven or held against movement, as by a chain 11, from a member 12, herein illustrated as a sprocket keyed to a shaft 5. In the present embodiment of the invention, the rotatable member 5 is an element of any driven machine or mechanism, not shown, working as on an element of lineal continuity 14.

Surrounding the sleeve-like member 9, there is an expansible and contractible member, herein illustrated as a coil spring 15. One end of this coil spring is connected to the sleeve-like member 4, as at 16, the opposite end thereof being connected as at 17, to the sprocket wheel 10. Reference numeral 18, designates a bell shaped member adjustable on the shaft 3, as by means of the set-screw 19. This member 18 forms a brake drum or element with which the expansible and contractible member is adapted to engage when it is expanded. Adjustability of the brake member 18, towards and away from the sprocket 10, determines the number of convolutions of the member 15, which will engage the inner face of the brake member 18, when the member 15 is expanded. As the braking force is equal to the pressure of the member 15 on the drum 18, three coils in contact with the drum will give substantially three times the braking force of one coil in contact with the drum 18.

The field frame or housing 2, has a hub extension on which is mounted a plurality of sliprings, 20, which are insulated from the frame or housing, and which have electrical connection with a suitable source of electric current supply, as by brushes. The shaft 3 has an extension and, in the present embodiment, one of the intergeared friction rollers 21, between which the element 14 is engaged, is carried by this extension.

This form of the invention operates as follows:

The expansible and contractible brake member 15, as before stated, is in the form of a coiled spring and it is of such size that it must be slightly contracted by placing it under tension in order that the bell-shaped member 18, may be passed over it. This tension, tends at all times when the motor is de-energized, to cause engagement of the member 15, with the interior of the drum to prevent relative rotation of the motor parts. With the parts in this position and the rotatable driving member 10 held against movement and an electric current supplied to the motor 8 in such a manner as to turn the shaft 3, in the direction of the arrow X in the Figure 1, the member 15, will be wound up on the member 9, and will disengage from the face of the drum 18. On cut-off of power to the motor and when the torque applied to the sprocket 10, falls below a predetermined value, the member 15, automatically uncoils and engages the inner surface of the drum 18. The spring 15 is held in circular form and out of contact with the drum 18 and wrappingly engages the members on the extension 4 for limited compression when current is supplied to the windings of the motor 8.

In this last described use of the invention, the torque motor 8 forms a tension element or torque clutch of a driving connection for co-operating mechanism adapted to engage an element having lineal continuity, thereby to maintain a predetermined testing, straightening or tensioning force upon said element when at rest as well as when in motion.

Referring now to Figure 3, the tape 30 runs over a reel 31 and is wound thereon a number of times equal to the travel of the car 32. The reel 31, rotates with the shaft 33. The tape at the one end is secured in the bottom of the tape groove of the reel 31, in any desired manner. The other end of the tape is associated with the car 32. A floor controller or similar device O is operatively connected to the reel 31 and to a torque motor 8, as by the shafts 33 and 36 and by the gears 34 of the controller O. The motor 8 is provided with a gear train and relatively rotatable inner and outer electro-magnetic units. Connected with the motor circuit, are the insulated sliprings 20. The brushes 42, are connected with a suitable source of electric current supply. Operatively connected, as with the cable sheave 35, is a gear housing 40, with the electric motor 8, rigidly supported thereby. The motor 8, and the gearhousing 40, are rotatable in the bearings 1. The frame member of the motor 8, and the gearhousing 40, are mounted to rotate with the shaft 43 and the extension 4, and operatively connected with the member 35 of the elevator driving means, as by a driving chain 11, and as by the sprockets 10 and 12. The rotor shaft of the torque motor 8, carries a pinion A. The gear train, in the present embodiment, is of the planetary type and consists of spurgears or idlers B radially disposed about the central pinion A, and in turn mesh with an internal gear C. The idlers are mounted, as upon a split or two part spider 44, one part of which is keyed or integral with the shaft 36, and rotatable on the bearing 46. The other part of the spider 44 has a bearing 45. The parts of the spider are rigidly held together, as by bolts.

The intermediate gear B might be compounded as illustrated in Figure 4 and two or more stages may be combined in series. The construction and arrangement of the gearing is that ordinarily employed in gear motors and it is not deemed necessary to recite the construction in detail.

The utility of the present invention as a clutch for direct or electric driving is readily apparent from the above description. The features of a driving connection with a torque clutch have been described in my co-pending application, Serial No. 719,727, for Driving mechanism, wherein I also describe an improved torque controlled brake band with an adjustable actuating spring.

It is to be understood that this invention is not limited to the particular form of equipment or embodiments illustrated. Such equipment and embodiments are to be considered as merely schematic and illustrative of the operation and utility of the invention in a concrete operative system.

What is claimed is:

1. In a torque clutch the combination with an electric torque motor having a rotatable rotor and a rotatable frame member, of a brake drum rotatable with one of said members and means rotatable with the other of said members, including an expansible and contractible friction member, for automatically effecting pressure engagement with the friction surface of the said brake drum and thereby a braking action between the rotor member and the said frame member so as to resist relative rotative movement of the rotor member and the said frame member when the torque exerted by the said torque motor falls below a predetermined value.

2. The combination of a shaft to be driven, an inner electromagnetic unit attached to said shaft, an outer electro-magnetic unit rotatable about the inner unit, a brake drum secured on said shaft and means carried by the said outer unit embodying a friction member adapted to effect automatic pressure engagement with the brake drum for connecting the inner unit against relative rotation with respect to the outer unit when the torque falls below a predetermined value, said friction member having the one end connected with said outer unit and the other end secured in such a manner that rotation of the said outer unit in the one direction disengages the friction member from the brake drum and allows relative rotation of the inner unit with respect to the outer unit.

3. A structure as set forth in claim 2, wherein said friction member comprises a coiled spring and said brake drum is adjustable so as to engage any desired number of coils or parts of coils of the said spring to vary the value of the pressure exerted by the said spring upon the friction surface of the brake drum, and thereby adapted to regulate its braking action.

4. The combination with an electro-magnetic gear having rotatable inner and outer units, a clutch between said inner and outer units adapted to be opened for electric driving and automatically closed for direct driving when the turning strain falls below a predetermined value, said clutch comprising torque controlled means under the influence of one of the units, including a contractible and expansible friction member, and a drum rotatable with the other of said units.

5. In a torque clutch, a shaft to be driven, a brake drum attached to said shaft, an electric torque motor having a rotatable frame member and a rotatable rotor, with the rotor in driving relation with said shaft, a driving member rotatable on the frame member, an expansible braking member for the drum operatively connected to the driving member and the said frame member, said braking member adapted by its expansion to engage the brake drum and thereby yieldingly resist relative movement between the rotor and the frame member when the torque exerted by the torque motor falls below a predetermined value.

6. In a torque clutch, the combination with a driven member and a brake drum attached to the driven member, of an electric torque motor with relatively rotatable rotor and frame member, a gear operatively connecting the rotor and the frame member with the driven member so that the torque motor works with mechanical advantage with respect to the load on the driven member, a driving member rotatable on the frame member, a contractible and expansible friction member operatively connecting the driving member and the frame member, said friction member adapted by its expansion to engage the brake drum and thereby yieldingly resist relative movement between the rotor and the frame member when the torque upon the driven member falls below a predetermined value.

7. In a torque clutch, the combination with a shaft to be driven and a brake drum attached to the shaft, of an electric torque motor having a rotatable rotor and a rotatable frame member provided with an extending part, a driving member rotatable on the said extending part, a gear operatively connecting the rotor and the frame member with the shaft so that the torque motor works with mechanical advantage with respect to the load on the shaft, an expansible and contractible member connected to the driving member and the extending part of the frame member and adapted by its contraction to cause the said members to rotate together and by its expansion to effect a braking action upon the brake drum.

8. A torque clutch, comprising in combination a rotatable shaft, a brake drum attached to the shaft, an electric motor having relatively rotatable rotor and frame member, a train of gearing operatively connecting the rotor and the frame member with the shaft so that the motor works with mechanical advantage with respect to the load on the shaft, a driving member rotatable on the frame member, a contractible and expansible friction member connected to the driving member and the frame member and adapted by its contraction to cause said members to rotate together and by its expansion to effect a braking action upon the brake drum and thereby direct driving of the shaft, the parts being constructed and arranged so that said motor, when energized, is effective for disengaging the friction member from the brake drum and for driving the shaft.

ALFRED JOHNSON.